May 30, 1972  L. DICKY  3,666,333
SEALING ARRANGEMENT FOR THE CASINGS OF UNDERGROUND MOTORS
Filed Oct. 13, 1970  3 Sheets-Sheet 1

INVENTOR.
LEONIDE DICKY
BY
John J. Hart
ATTORNEY

May 30, 1972    L. DICKY    3,666,333
SEALING ARRANGEMENT FOR THE CASINGS OF UNDERGROUND MOTORS
Filed Oct. 13, 1970    3 Sheets-Sheet 2

INVENTOR.
LEONIDE DICKY
BY
ATTORNEY

United States Patent Office 3,666,333
Patented May 30, 1972

3,666,333
SEALING ARRANGEMENT FOR THE CASINGS OF UNDERGROUND MOTORS
Leonide Dicky, Grenoble, France, assignor to Societe Generale de Constructions Electriques et Mecaniques (ALSTHOM), Grenoble, France
Continuation-in-part of application Ser. No. 50,200, June 26, 1970. This application Oct. 13, 1970, Ser. No. 80,345
Claims priority, application France, June 30, 1969, 6921907
Int. Cl. F16c 33/78
U.S. Cl. 308—187.1                10 Claims

ABSTRACT OF THE DISCLOSURE

The sealing arrangement may include a conventional external sealing device having its interior in contact with the lubricant filling the bearing chamber of the motor of an underground drilling machine, a space isolated from the outer environment by a second seal and filled with a protective product under a slightly greater pressure than that of the outer enironment. The pressure on the protective product is effected by a casing fitted with a piston, one side of the space defined by the piston constitutes a part of the space filled with the protective product, and the space on the other side of the piston being in communication with the bore hole and containing a spring acting on the piston. Instead of a conventional sealing device, there may be used a sealing device capable of pressuring the lubricant so that it is placed under a slightly greater pressure than the protective product, thereby preventing possible contamination of the lubricant by the protective product.

---

This application is a continuation-in-part of application Ser. No. 50,200 filed June 26, 1970.

This invention relates to underground motors of the type employed in drilling machines, such as electric drills, turbo-drills, and the like, and more particularly to arrangements or devices for sealing the casings of such motors.

Motors of the indicated type may be fitted with radial bearings, or with center thrust bearings which work in a lubricant filled space. When such motors are used underground in bore holes, it is necessary to insulate the lubricant in such space from the mud flush in the bore hole by fitting sealing devices between the moving and stator parts of the machine. The working life of known sealing devices is usually inadequate, of the order of from 50 to 80 working hours, because their insulation is rapidly destroyed by the mud flush.

The primary purpose of this invention is to provide an arrangement which will materially extend the working life of seals for the lubricant in motors of the indicated type.

In accordance with the invention, the conventional type of motor lubricant seal, is itself isolated in a chamber from the surrounding environment. The chamber is formed by a second seal and is filled with a protective product, such as lubrication grease. The protective product is under a pressure slightly greater than that of the surrounding environment. This over-pressure is produced by a known type of pressure compensating device, composed of a cylinder with a piston, one side of the cylinder being in communication with the lubricant filled space and the other side of such cylinder being in communication with the bore hole. A spring is located in such other side of the cylinder and bears on the piston to provide the desired pressure adjustment. Because of this construction, the bearing case sealing joint is insulated from the mud flush by the interposition of a protective product which is itself insulated from the mud flush by a second seal. As the protective product is kept at a pressure slightly greater than that of the surrounding environment, any leaks through the second seal can only be towards such environment, thereby effectively protecting such seal against the penetration of mud flush. The pressurizing system for the chamber containing the protective product may in accordance with the invention, be composed of one or more pressure compensating pistons.

A better understanding of the invention will be had from a perusal of the following specification, when read in connection with the accompanying drawings which show by way of example several constructions by which the invention may be practiced and in which.

Figure 1:
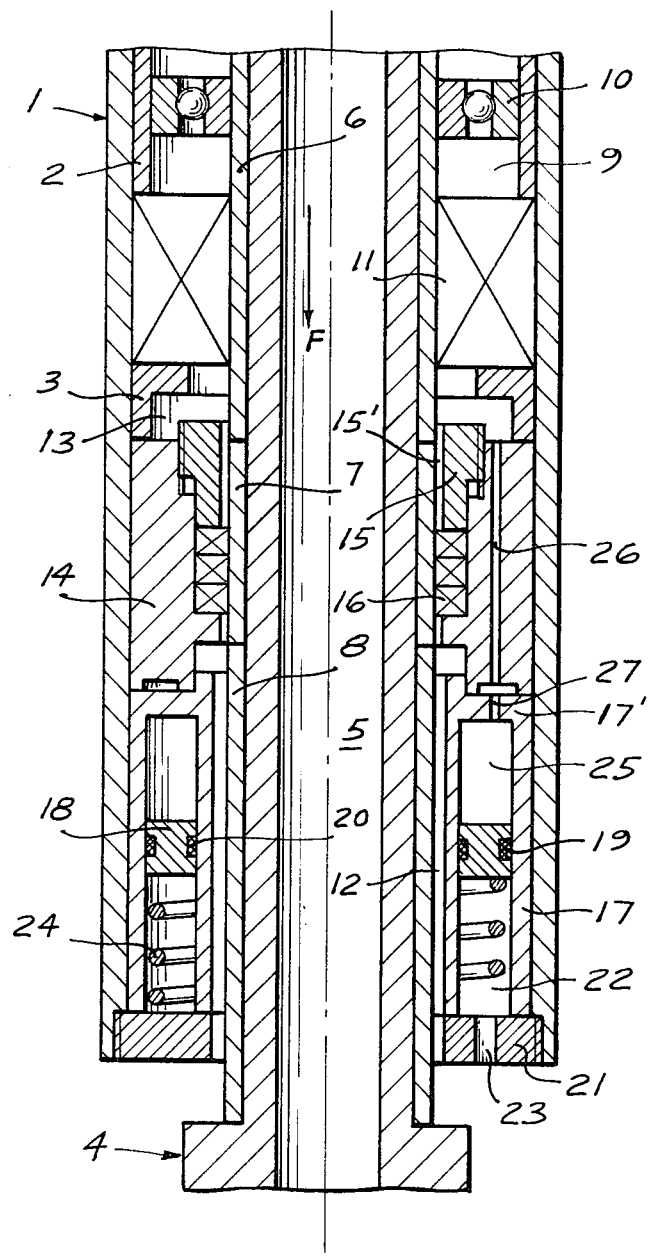
FIG. 1 is an axial view showing a device embodying the invention fitted below a turbo-drill bearing casing.

In FIG. 1 of the drawings, the reference numeral 1 generally designates the static body of a conventional turbo-drill within which is located a rotating drill shaft generally designated 4 and driven by the customary turbine blades, not shown. The shaft 4 is hollow and provides a conduit for the mud flush that has passed through the outlet of the turbine blades and flows through the bore 5 thereof in the direction of arrow F and towards the usual drilling bit (not shown) which is screwed to the end of shaft 4 in the usual manner. The body 1 of the turbo-drill is protected by braces 2 and 3, while the shaft 4 is protected by wear rings 6, 7 and 8. Formed between the brace 2 and wear ring 6 is an annular space 9 containing the usual radial and central bearings, one of which, the ball-race 10, is shown in the drawing. The space 9 is filled with a suitable lubricant as is customary. The lower end of the casing or space 9 is sealed by a conventional type of sealing joint 11, which preferably is a fully enclosed rotary joint. The sealing joint 11 is in turn sealed from the lower space between the casing 1 and shaft 4 by a packing gland located in the region of the wear ring 7 and composed of a box 14, a cap 15 and braided rings 16 between the box 14 and wear ring 7. It will be noted that the brace 3 is a flanged annulus separating the sealing joint 11 from the packing gland and forming therebetween an annular space 13. The space 13 is in communication with a space 25 formed in an annularly-shaped cylinder housing 17 through a longitudinally extending passageway 26 bored throughout the length of the box 14 of the packing gland and an aligned opening 27 bored in the inner annularly shaped wall 17' of the housing 17 which abuts against the outer end of the packing gland box 14. The space 13, passageway 26, opening 27 and cylinder space 25 are filled with a protective product which, as has been previously indicated, may be a lubricating grease, and preferably one of the silicone base variety and unaffected by water. The protective product may be also of any other suitable material, such as, an oil having a viscosity equal to or greater than that of the oil which fills the bearing space 9, or a product of the type employed in the displacement of water, or aqueous solutions, for example, a commercial anti-rust fluid. The braided rings 16 of the packing gland are also preferably impregnated with the protective product by bringing the space in which they are located in communication with the space 13 through an annular space 15' formed by the interior surface of the cap 15 of the packing gland.

Located in the cylinder housing 17 and forming the space 25 therein is an annular piston 18 fitted with sealing joints 19 and 20. The piston forms in the housing 17 a second space 22 which is partially closed by an annular piece or cap 21 screwed into the lower end of the body 1. The piston 18 which is slidably mounted in the housing 17, is loaded by a spring 24 which is located in the cylinder space 22 and bears against the inner face of the annular cap or piece 21. The spring 24 maintains the protective product contained in the cylinder space 25, and consequently also in the space 13, at a pressure slightly greater than that of the mud flush in the bore hole. The space 22 containing the spring 24 is in communication with the external environment through an opening 23 bored in the cap 21 and consequently is filled with mud flush from the bore hole. The annular space 12 formed between the wear ring 8 and the cylinder housing 17 and cap 21 is also filled with mud flush since it is open to the exterior environment. It will be noted however, that the outer face of the sealing joint 11 is in contact only with the protective product that is maintained at a slight overpressure in space 13. Accordingly, the joint 11 is provided with efficient protection against any mud flush that may enter into the lower end of the case through the cap 21 or the annular space 12. As a consequence, the working life of the seal provided by the joint 11 will be materially prolonged beyond that possible in prior constructions.

Figure 2:
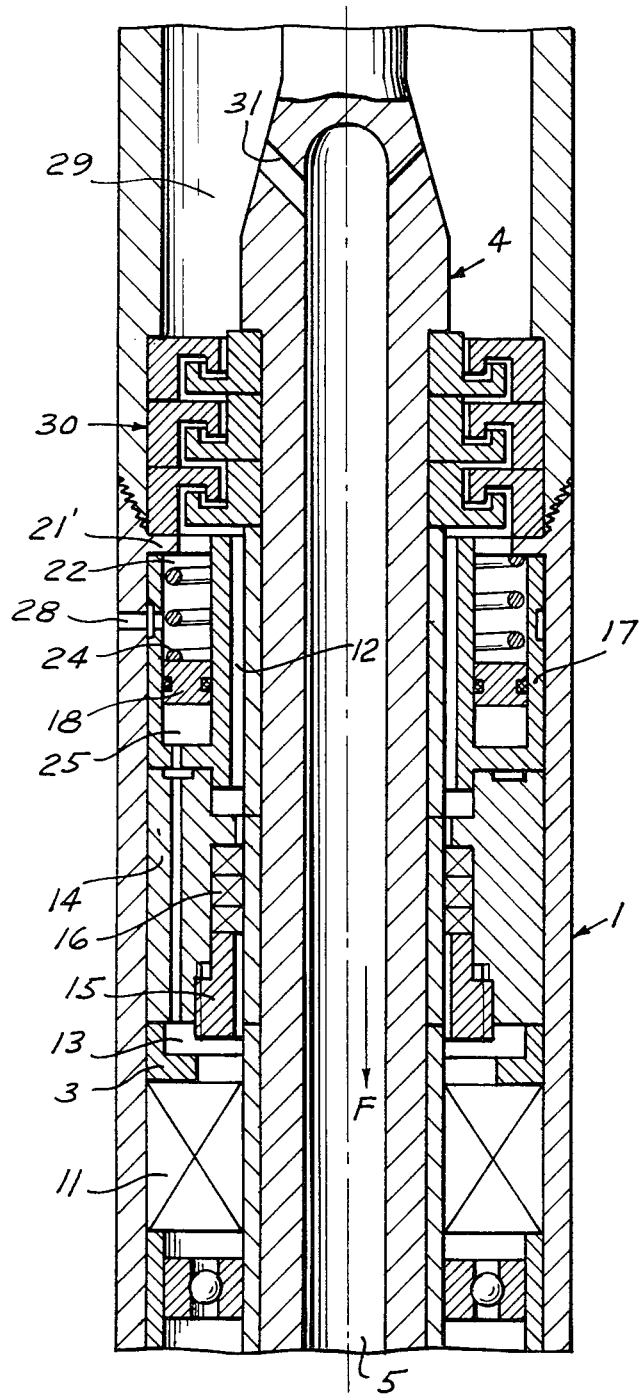
FIG. 2 is a similar view of a device embodying the invention fitted above a turbine bearing casing.

FIG. 2 of the drawings illustrates how the invention may be utilized in the area above the turbo-drill bearing case. In this region of the machine there is an additional factor to be considered, namely, the high pressure under which the mud flush is ejected into the space 29 by the turbine blading, and from which space the mud flush passes through openings 31 in the shaft 4 into the bore 5 formed in such shaft. To take care of this factor there is employed a feature which is utilized in the arrangement disclosed in my copending application Ser. No. 30,803, filed Apr. 22, 1970 for Thrust Bearings for Underground Drilling Machines.

It will be observed that the sealing joint 11 shown in the arrangement of FIG. 2 is protected from the mud flush by a second seal and pressure compensating arrangement which is identical to that shown in FIG. 1 of the drawings. Accordingly, the parts constituting such arrangement in FIG. 2 of the drawings have applied thereto the same reference numerals which such parts bear in the arrangement of FIG. 1 located below the turbine casing.

Figure 3:
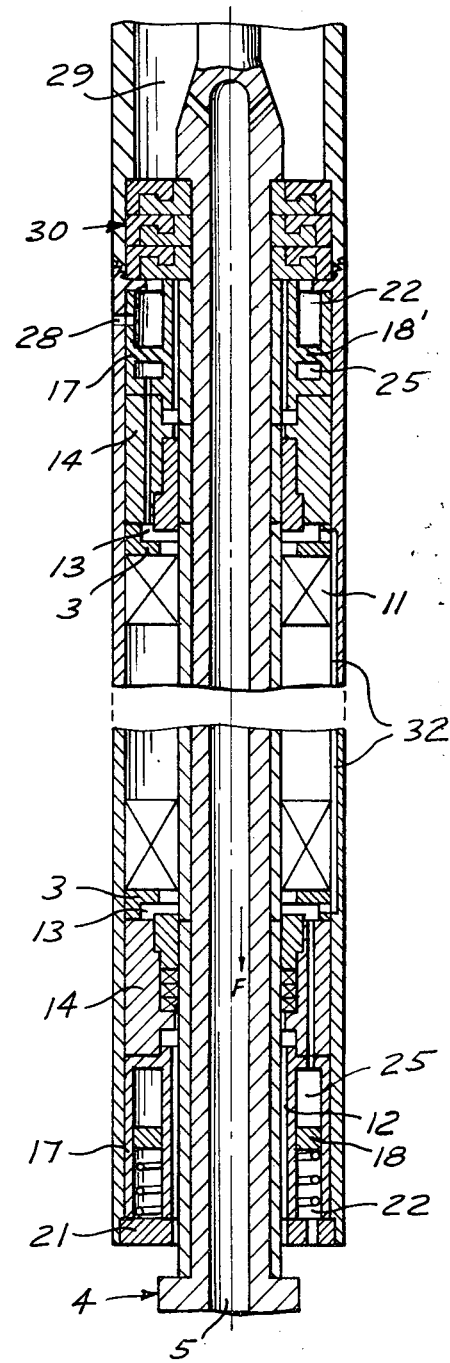
FIG. 3 is a schematic view showing the arrangements of FIGS. 1 and 2 combined to effect a pressurized condition in both arrangements by one pressure applying means.

The embodiment of FIG. 2 differs from that of FIG. 1 in the following respects. Instead of bringing the space 22 containing the spring 24 in the cylinder housing 17 into unrestricted communication with the external environment through the opening in the flanged end 21' of such housing, which would open such space to the high pressure mud flush in the annular space 29 between the body 1 and the shaft 4, such space 22 is placed in unrestricted communication with the exterior through aligned openings 28 bored in the body 1 and the outer wall of the annularly-shaped cylinder housing 17. The space 29 through which the mud flush is ejected under pressure is isolated from space 22 by a labyrinth sealing device 30 customarily used in turbo-drilling machinery. The device 30 is constructed similarly to the labyrinth sealing device disclosed in the aforesaid application Serial No. 30,803 to limit mud leaks therethrough to a technically acceptable flow level. As a consequence of this arrangement, the space 22 above the turbine casing contains mud flush which is at the same pressure as the mud flush which surrounds the body 1 and fills the bore hole. This pressure in the space 22 shown in the arrangement of FIG. 2 is the same pressure that exists in the annular space 22 shown in FIG. 1 in the arrangement below the turbine casing. Accordingly, by producing a substantially similar slight overpressure in the protective products contained in the spaces 13 and 25 in both arrangements, i.e., the arrangement of FIG. 1 located in the lower part of the turbine casing, and the arrangement of FIG. 2 located in the upper part of the turbine casing, compared with the pressure of the mud flush in the bore hole, penetration of the flush into the protective product is prevented. It is to be noted that the arrangements of FIGS. 1 and 2 are shown as separate arrangements in which case the protective product used in each arrangement may be constituted of the same material, or of different materials. It is within the contemplation of the invention to replace the piston 18 and its associated spring 24 in one of the upper and lower arrangements by a fixed wall and connecting the spaces 13, 25 in both arrangements by channeling. Thus, as shown in FIG. 3 of the drawings, the upper arrangement is similar to that shown in FIG. 2 of the drawings, but the annular piston 18 of such upper arrangement may be replaced by a fixed wall 18', while the lower arrangement remains identical to that shown in FIG. 1 of the drawings. In this modified embodiment the spaces 13 and 25 of the two arrangements are brought into communication by channeling 32 of other suitable conduit means extending between the two spaces 13, 13. In such a construction, the protective product used would be common to both arrangements and pressure of the protective product in both spaces 25 would be equalized by the piston 18 and spring 24 remaining in the other or lower arrangement.

Figure 4:
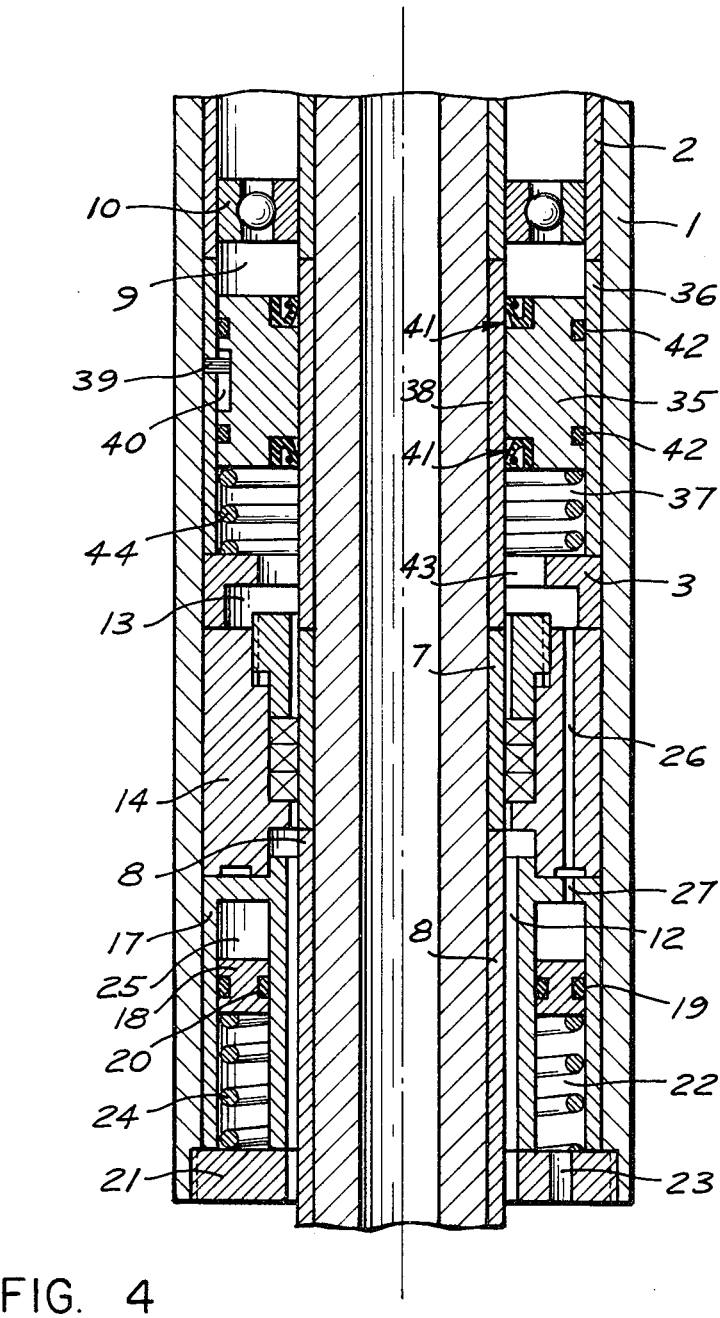
FIG. 4 is a view similar to FIG. 1 showing the arrangement of the latter provided with means for pressurizing the lubricant.

It is also within the contemplation of this invention to pressurize the lubricant which fills the space 9 of the turbine bearing housing in order to minimize the possibility of the protective product that is under pressure in the space 13 of either or both of the previously described arrangements, penetrating through one or both, respectively, of the conventional type sealing joints 11 and thereby contaminating the lubricant in the turbine bearing housing. This may be accomplished by substituting for the conventional type of sealing joint 11, a sliding seal which enables the establishment of a pressure equilibrium between associated spaces 9 and 13, or even enables the establishment of a slightly greater pressure in the lubricant in space 9 than in the protective product in space 13. Such a sliding seal is shown in FIG. 4 of the drawings in the arrangement substantially similar to that illustrated in FIGS. 1 and 3 for the bottom of the turbodrill body 1. Inasmuch, that except for the sliding seal, the arrangements shown in FIGS. 1 and 4 are the same, the same reference numbers have been applied to similar parts in the two figures and it is believed unnecessary to repeat the description and operations of such similar parts.

As is shown in FIG. 4 of the drawings, the sliding seal substituted for the conventional type seal 11 in FIG. 1, comprises a slidable annular seal holder 35 located adjacent to the body brace 3, and between the latter and the ball-race 10 in the turbine bearing housing space 9. The holder 35 is housed in an annular space 37 formed between an outer sleeve 36 fitted in the body 1 between the body braces 2 and 3, and a wear ring 38. The movements of the holder 35 in the space 37 are restricted to longitudinal movements by a pin 39 fitted into an opening in the sleeve 36 and extending into a longitudinal slot 40 machined in the holder 35. The pin 39 and slot 40 coact to prevent the holder 35 from turning in the space 37, but permit it to slide freely longitudinally within a range of stroke determined by the length of the slot 40. The holder 35 is provided at its ends with two internal grooves in which are seated seals 41, 41 which seal the region between such holder and the wear ring 38 against the passage of lubricant or protective product therethrough. The exterior surface of the holder 35 is provided with spaced external grooves into which are fitted O-rings 42, 42 which provide a liquid-proof seal between the holder 35 and the sleeve 36.

It will be understood from the foregoing, that the protective product in the spaces 13 and 25 and in the passageway 26 connecting such spaces, will also fill the opening 43 in the brace member 3 and the portion of the space 37 below the holder 35, but will be obstructed from passing the holder 35 to penetrate into the lubricant space 9 by the seals 41, 41 and the O-rings 42, 42 on such holder. The pressure of the protective product in the space 37 on the holder 35 will cause the latter to slidably move in the space 37 in a direction to pressurize the lubricant in the space 9 and to a position where the values of the pressures in the protective product and in the lubricant will be approximately equal. When this condition of pressure equilibrium is attained the likelihood of any leakage of the protective product into the lubricant is rendered remote. In order to assure that there is no danger of the protective product in the spaces 13 and 37 contaminating the lubricant in space 9, especially in those situations wherein the seals 41 for one reason or another do not provide perfect seals so that there exists the possibility that leakage of the protective product past the holder 35 might occur, it is contemplated that the lubricant in the space 9 be placed under a slightly greater pressure than the protective product. This may be accomplished, as is shown in FIG. 4 by providing between the brace member 3 and the holder 35 a spring 44 capable of producing such slightly greater pressure on the lubricant. Thus, if the seals 41 should not provide perfect seals so that slight leakage can occur past the holder 35, such leakage will be by the lubricant in space 9, but because of the greater pressure of the lubricant, the protective product could not leak past the holder 35 and contaminate the lubricant in space 9.

What is claimed is:

1. An underground motor comprising a casing, a rotatable shaft, and bearing means located in an annular bearing space between said casing and shaft, said bearing space being filled with lubricant for said bearing means, a sealing device at the outer end of said bearing space and having its interior end in contact with the lubricant filling such space, a second seal spaced from the exterior end of said sealing device and forming a chamber therebetween, a protective product filling said chamber, and means for maintaining said protective product under a pressure greater than that present in the outer environment of said casing, said pressure means comprising an annular cylinder housing located between said casing and shaft, and fitted with an annular piston, the space formed in the inner side of said housing by said piston being in communication with said chamber and filled with said protective product, the space formed in the outer side of said housing by said piston being in communication with the bore hole in which the motor may be located, and a pressure adjustment spring mounted in said outer housing space and acting on said piston, said second seal being constituted of a packing gland having a body extending from said chamber to the inner end of said cylinder housing, said body and said housing inner end having registered longitudinally extending bores defining a passageway between said chamber and said inner housing space.

2. An underground motor comprising a casing, a rotatable shaft, and bearing means located in an annular bearing space between said casing and shaft, said bearing space being filled with lubricant for said bearing means, a sealing device at the outer end of said bearing space and having its interior end in contact with the lubricant filling such space, a second seal spaced from the exterior end of said sealing device and forming a chamber therebetween, a protective product filling said chamber, and means for maintaining said protective product under a pressure greater than that present in the outer environment of said casing, said pressure means comprising an annular cylinder housing located between said casing and shaft, and fitted with an annular piston, the space formed in the inner side of said housing by said piston being in communication with said chamber and filled with said protective product, the space formed in the outer side of said housing by said piston being in communication with the bore hole in which the motor may be located, and a pressure adjustment spring mounted in said outer housing space and acting on said piston, the side wall of said housing and said casing being provided with registered openings to bring said outer housing space into communication with the bore hole.

3. An underground motor comprising a casing, a rotatable shaft, and bearing means located in an annular bearing space between said casing and shaft, said bearing space being filled with lubricant for said bearing means, a sealing device at each end of said bearing space and having its interior end in contact with the lubricant filling such space, a second seal spaced from the exterior end of each sealing device and forming a chamber therebetween, means bringing such two spaced chambers into communication with each other, a common protective product filling both of such chambers and said communicating means, and means for maintaining the protective product in both of said chambers under a pressure greater than that present in the outer environment of said casing.

4. An underground motor as defined in claim 3, in which said pressure means comprises an annular cylinder housing associated with each end of said bearing space and each having partitioning means dividing the interior thereof into inner and outer spaces, the inner spaces of said housing being in communication with said chambers and being filled with protective product, the cylinder housing associated with one end of said bearing space having an outer end wall provided with an opening for bringing the outer space therein into communication with the bore hole, and the side wall of the cylinder housing associated with the other end of said bearing space and the surrounding portion of said casing being provided with registered openings to bring said outer space therein into communication with the bore hole.

5. An underground motor as defined in claim 4, in which said partitioning means in at least one of said cylinder housings is composed of a piston, and a pressure adjustment spring mounted in the outer space of said one housing and acting on said piston.

6. An underground motor as defined in claim 5, in which said partitioning means in the other of said cylinder housings is composed of a fixed wall, and means bringing the inner spaces of said two housings into pressure communication with each other.

7. An underground motor comprising a casing, a rotatable shaft, and bearing means located in an annular bearing space between said casing and shaft, said bearing space being filled with lubricant for said bearing means, a sealing device at the outer end of said bearing space and having its interior end in contact with the lubricant filling such space, a second seal spaced from the exterior end of said sealing device and forming a chamber therebetween, a protective product filling said chamber, and means for maintaining said protective product under a pressure greater than that present in the outer environment of said casing, said first mentioned seal comprising slidable seal means having its exterior end in contact with the protective product filling said chamber and separating such protective product from the lubricant in said bearing space, said slidable seal means being in a position of equilibrium between the pressures bearing on the interior and exterior ends thereof.

8. An underground motor as defined in claim 7, in which said slidable seal means comprises an annular-shaped seal holder carrying two spaced ring seals on its inner periphery and two spaced ring seals on its outer periphery.

9. An underground motor as defined in claim 7, including means to restrict the movements of said slidable seal means to directions longitudinally of said casing.

10. An underground motor as defined in claim 7, including means located in said chamber for applying to said slidable seal means an additional pressure, whereby the pressure on the lubricant is slightly greater than the pressure on the protective product.

References Cited

FOREIGN PATENTS 333,339   8/1930   Great Britain _____ 277—59

MARTIN P. SCHWADRON, Primary Examiner

F. SUSKO, Assistant Examiner